United States Patent [19]
Nienburg et al.

[11] 3,818,057
[45] June 18, 1974

[54] DIMETHYL-W-CARBOXYALKYLPHOSPHINES AND THEIR ALKYL ESTERS

[75] Inventors: Hans Juergen Nienburg, Ludwigshafen; Wilhelm Kniese, Limburgerhof; Rudolf Kummer, Frankenthal; Peter Tavs, Limburgerhof, all of Germany

[73] Assignee: Badische Anilin- & Soda-Fabrik Aktiengesellschaft, Ludwigshafen/Rhein, Germany

[22] Filed: Aug. 27, 1971

[21] Appl. No.: 175,777

[30] Foreign Application Priority Data
Sept. 8, 1970 Germany............................ 2044361

[52] U.S. Cl. .............................................. 260/403

[51] Int. Cl. ........................... A23j 7/00, C07f 9/02
[58] Field of Search ................................... 260/403

[56] References Cited
UNITED STATES PATENTS
2,957,931  10/1960  Hamilton et al. .................. 260/403
3,654,342   4/1972  Gillham et al. ................. 260/465.8

Primary Examiner—Elbert L. Roberts
Attorney, Agent, or Firm—Johnson, Keil, Thompson & Shurtleff

[57] ABSTRACT

Dimethyl-ω-carboxyalkylphosphines and their alkyl esters which are valuable as modifying agents for catalysts used in the oxo reaction.

7 Claims, No Drawings

DIMETHYL-ω-CARBOXYALKYLPHOSPHINES AND THEIR ALKYL ESTERS

This invention relates to dimethyl-ω-carboxyalkylphosphines and the alkyl esters thereof, which compounds have not previously been described in the literature.

According to the invention, there are provided hitherto undescribed dimethyl-ω-carboxyalkylphosphines and their alkyl esters of the general formula:

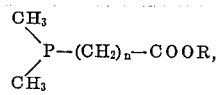

in which R denotes hydrogen or alkyl of from 1 to 12 carbon atoms and n is an integer from 8 to 14.

Dimethyl-ω-carboxyalkylphosphines are prepared for example by reacting dimethylphosphine with ω-alkenoic acids at temperatures of from 10° to 35° C in inert solvents, for example ethers such as tetrahydrofuran, either with irradiation by actinic light or with the addition of free-radical-generating compounds such as diacyl peroxides, e.g. dibenzoyl peroxide, alkyl hydroperoxides and dialkyl peroxides. The selection of the free-radical-generating compounds is governed by the half-life of the compounds and the reaction temperature to be used. Advantageously, dimethylphosphine is used in an excess of, say, up to 30 percent molar.

Dimethyl-ω-carbalkoxyalkylphosphines may be prepared for example by reacting ω-alkenoic acids with from four to five times the molar amount of phosphorus hydride dissolved in an inert solvent such as tetrahydrofuran or methanol at temperatures of from 30° to 150° C and in the presence of a compound which decomposes into free radicals at the reaction temperature, such as azo-diisobutyronitrile, nitrile peroxides, diacyl peroxides such as dibenzoyl peroxide, alkyl hydroperoxides and dialkyl peroxides. The resulting ω-carboxyalkylphosphines, which contain not only the primary phosphines but also small amounts of secondary and tertiary ω-carboxyalkylphosphines, are esterified by known methods with lower alkanols, for example methanol, in the presence of acid catalysts, and the pure ω-carboethoxyalkylphosphines are isolated by distillation. These are then reacted in excess with methyl iodide or methyl bromide in suitable solvents such as methanol, and the resulting quaternary phosphines are treated with alcoholic alkali solution, e.g. methanolic sodium hydroxide solution. Esters of dimethyl-ω-carboxyalkylphosphines with higher alcohols may be simply obtained by transesterification of the corresponding methyl ester with higher alcohols. The separate transesterification step may be omitted if desired, since esterification takes place at the same time as the methylation with methyl iodide or methyl bromide in methanol.

Dimethyl-ω-carboxyalkylphosphines and their alkyl esters are extremely valuable modifying agents for metal carbonyl complexes, especially cobalt and rhodium carbonyl complexes, which are used as catalysts in the oxo reaction. Due to the ready availability of undec-10-enoic acid, the products dimethyl-10-carboxydecylphosphine and its esters with alkanols having from 1 to 12 carbon atoms have gained particular commercial importance. Metal carbonyl complexes modified with these compounds provide a higher proportion of straight-chain compounds in the oxo reaction, readily decomposable metal carbonyl complexes being stabilized thereby so that no precipitation of metal occurs and the modified metal carbonyl complexes contained in the residue following working up may be directly reused as catalysts in further oxo reactions. Furthermore, the phosphines of the invention, when used in association with the oxo reaction, have the advantage of low volatility and they do not therefore contaminate the desired valuable products.

The invention is described below with reference to Examples.

EXAMPLE 1

800 g of dry argon-saturated tetrahydrofuran and 350 g of undec-10-enoic acid are placed in a reaction vessel under a protective blanket of argon. The reaction vessel is equipped with a concentric water-cooled ultraviolet lamp. The solution is cooled to −5° C, and 170 g of dimethylphosphine, cooled to −80° C, are added. The temperature of the mixture is allowed to rise to ambient temperature, while the mixture is stirred vigorously for 24 hours. Unreacted dimethylphosphine and the solvent are then distilled off in vacuo. There are obtained 450 g (96 percent of theory) of dimethyl-10-carboxydecylphosphine, m.p. 55° C. Upon analysis it is found to contain:

C 63.7 percent, H 11.1 percent, P 11.8 percent.
$C_{13}H_{27}PO_2$ requires:
C 63.4 percent, H 11.0 percent, P 12.6 percent.

EXAMPLE 2

92 g of undec-10-enoic acid, 8 g of azo-diisobutyronitrile, 160 g of tetrahydrofuran and 68 g of phosphorus hydride are placed in a high-pressure vessel having a capacity of 1 liter, the vessel having been meticulously purged with argon. The reaction vessel is shaken while the reaction mixture is heated to 80° C over 3 hours and then maintained at this temperature for 10 hours. After cooling, the reaction mixture is depressured and the solvent is distilled off in a vacuum produced by a filter pump. The residue is boiled under reflux with 150 g of methanol and 5 g of sulfuric acid for 1 hour. The mixture is then washed with water until neutral and the organic phase is fractionally distilled. There are obtained 60 g (55 percent of theory) of 10-carbomethoxydecylphosphine, b.p. 103° to 105° C / 0.1 mm.

23 g of the above 10-carbomethoxydecylphosphine and 70 g of benzene are placed under argon in a reaction vessel having a capacity of 1 liter. The solution is heated to 55° to 60° C, a mixture of 31 parts of methyl iodide and 35 parts of methanol is added dropwise over 1 hour, and the mixture is then boiled under reflux for 4 hours. The volatile portions are distilled off in vacuo, and the residue is dissolved in 50 g of benzene, whereupon a 10 percent w/w methanolic sodium hydroxide solution is added dropwise until the pH is 6.5. The benzene layer is separated and the aqueous phase is extracted twice with 50 parts of benzene. The combined benzene extracts are fractionally distilled after the benzene has been evaporated off. There are obtained 21 g of dimethyl-10-carbomethoxydecylphosphine, b.p. 111° to 112° C/0.1 mm (81 percent of theory). Upon analysis it is found to contain C 64.8 percent, H 11.2 percent, P 11.7 percent. $C_{14}H_{29}PO_2$ requires: 64.7 percent, H 11.2 percent, P 11.9 percent.

COMPARATIVE EXAMPLE

To a vertical high-pressure tube having a capacity of 22 liters there are fed, per hour, 4 liters of a commercial $C_8$ to $C_{10}$ olefin mixture and 1 liter of the distillation residue of an oxo reaction mixture obtained by hydroformylation of the said olefin mixture and containing 5.6 g of cobalt in the form of carbonyl complexes and 104 g of trioctylphosphine. The internal pressure of the high-pressure tube is maintained at 80 atmospheres gage by pumping in carbon monoxide and hydrogen in a molar ratio of 1 : 2, the temperature being held at 195° C. The initial cobalt concentration in the high-pressure tube is 0.13 percent by weight. The atomic ratio of cobalt to phosphorus is 1 : 3. The discharged material is distilled in vacuo at 125° C/5 mm. 10 percent of the bottoms is separated, the remainder being recycled to the high-pressure tube. At the same time, appropriate quantities of cobalt 2-ethylhexanoate and trioctylphosphine, corresponding to the amounts of cobalt and phosphorus removed from the circulated stream, are added in solution to the olefin mixture. Analysis by gas chromatography shows that the distillate contains 18 percent by weight of unreacted olefin, 13 percent by weight of paraffins, 1 percent by weight of aldehydes and 68 percent by weight of alcohols. The proportion of straight-chain alcohols is 78 percent.

When the catalyst has been recycled 6 times, the cobalt concentration in the high-pressure tube has fallen to 0.11 percent by weight and the iodine number of the distillate has risen from 41 to 49. Precipitated cobalt is found in the distillation system.

EXAMPLE 3

The comparative example is repeated escept that dimethyl-10-carboxydecylphosphine is used in place of trioctylphosphine, that only 8 percent of the distillation residue is removed and only 8 percent of the cobalt and dimethyl-10-carboxydecylphosphine is replenished. Analysis by gas chromatography shows that the resulting distillate contains 10.5 percent of unreacted olefins, 10.5 percent of paraffins, 1.5 percent of aldehydes and 77.5 percent of alcohols, by weight. 78 percent of the alcohols formed are straight-chain alcohols. The iodine number of the distillate is 23.

When the catalyst has been recycled 20 times, the cobalt concentration in the high-pressure tube is still 0.13 percent by weight and no drop in the conversion rate and no cobalt deposits are observed.

Thus the use of dimethyl-10-carboxydecylphosphine as modifying agent leads to increased conversion, lower paraffin yields and improved catalyst stability.

We claim:

1. A phosphine having the formula

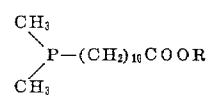

in which R denotes hydrogen or methyl.

2. A phosphine as claimed in claim 1 wherein R denotes hydrogen.
3. A phosphine as claimed in claim 1 wherein R denotes methyl.
4. A phosphine having the formula

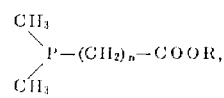

in which R denotes hydrogen or alkyl of from 1 to 12 carbon atoms and $n$ is one of the integers 8 to 14.

5. A phosphine as claimed in claim 4 wherein R denotes hydrogen or methyl.
6. A phosphine as claimed in claim 4 wherein R denotes hydrogen.
7. A phosphine as claimed in claim 4 wherein R denotes methyl.

* * * * *